(12) United States Patent
Brundage et al.

(10) Patent No.: US 7,676,060 B2
(45) Date of Patent: Mar. 9, 2010

(54) DISTRIBUTED CONTENT IDENTIFICATION

(76) Inventors: Trent J. Brundage, 27885 SW. 147th Ave., Sherwood, OR (US) 97140; Brett T. Hannigan, 165 E. O'Keefe St., #27, Menlo Park, CA (US) 94025; Ravi K. Sharma, 4247 NW. 125th Ave., Portland, OR (US) 97229

( * ) Notice: Subject to any disclaimer, the term of this patent is extended or adjusted under 35 U.S.C. 154(b) by 0 days.

(21) Appl. No.: 11/758,573

(22) Filed: Jun. 5, 2007

(65) Prior Publication Data

US 2007/0286454 A1 Dec. 13, 2007

Related U.S. Application Data

(63) Continuation of application No. 10/828,930, filed on Apr. 20, 2004, now Pat. No. 7,227,972, which is a continuation of application No. 09/978,332, filed on Oct. 16, 2001, now Pat. No. 6,724,914.

(51) Int. Cl.
*G06K 9/00* (2006.01)
*G06K 9/36* (2006.01)
(52) U.S. Cl. ........................ 382/100; 382/232; 713/176; 380/51; 380/54
(58) Field of Classification Search ................. 382/100, 382/232; 380/51, 54; 713/176
See application file for complete search history.

(56) References Cited

U.S. PATENT DOCUMENTS

| | | | |
|---|---|---|---|
| 4,450,531 A | 5/1984 | Kenyon et al. |
| 4,843,562 A | 6/1989 | Kenyon |
| 5,210,820 A | 5/1993 | Kenyon |
| 5,450,490 A | 9/1995 | Jensen et al. |
| 5,568,570 A | 10/1996 | Rabbani |
| 5,761,606 A | 6/1998 | Wolzien |

(Continued)

FOREIGN PATENT DOCUMENTS

EP 0 855 829 7/1998

(Continued)

OTHER PUBLICATIONS

Barni et al. "A new decoder for the optimum recovery of nonadditive watermarks." May 2001. IEEE Transactions on Image Processing. vol. 10, Issue 5. pp. 755-766.

(Continued)

*Primary Examiner*—Aaron W Carter
(74) *Attorney, Agent, or Firm*—Digimarc Corporation

(57) ABSTRACT

A method of identifying content in a distributed computing system. The method receives an image or audio signal in a first device in the distributed computing system, such as a cell phone or other wireless device. In this device, the method performs an analysis of characteristics of the signal to identify portions of the signal from which to derive a content identifier. The method then sends the portions to a second, remote device in the distributed computing system, such as a server. The server further processes the portions to derive a content identifier, which in turn, is used to look up data corresponding to the content, such as a Uniform Resource Locator. In the case of a wireless telephone network, for example, the method distributes the task of identifying content signals captured through the microphone or camera on the phones in the network.

10 Claims, 1 Drawing Sheet

U.S. PATENT DOCUMENTS

| | | | |
|---|---|---|---|
| 5,809,139 | A | 9/1998 | Girod et al. |
| 5,859,920 | A | 1/1999 | Daly et al. |
| 5,889,868 | A | 3/1999 | Moskowitz et al. |
| 5,905,800 | A | 5/1999 | Moskowitz et al. |
| 5,918,223 | A * | 6/1999 | Blum et al. ............... 707/1 |
| 5,933,798 | A | 8/1999 | Linnartz |
| 5,937,000 | A | 8/1999 | Lee et al. |
| 6,002,946 | A | 12/1999 | Reber et al. |
| 6,037,984 | A | 3/2000 | Isnardi et al. |
| 6,064,737 | A | 5/2000 | Rhoads |
| 6,121,530 | A | 9/2000 | Sonoda |
| 6,122,403 | A | 9/2000 | Rhoads |
| 6,125,172 | A | 9/2000 | August |
| 6,131,162 | A | 10/2000 | Yoshiura et al. |
| 6,148,331 | A | 11/2000 | Parry |
| 6,154,571 | A | 11/2000 | Cox et al. |
| 6,209,094 | B1 | 3/2001 | Levine et al. |
| 6,332,030 | B1 | 12/2001 | Manjunath et al. |
| 6,381,698 | B1 | 4/2002 | Devanbu et al. |
| 6,385,329 | B1 | 5/2002 | Sharma et al. |
| 6,386,453 | B1 | 5/2002 | Russell et al. |
| 6,389,055 | B1 | 5/2002 | August |
| 6,393,060 | B1 | 5/2002 | Jeong |
| 6,400,826 | B1 | 6/2002 | Chen et al. |
| 6,425,081 | B1 | 7/2002 | Iwamura et al. |
| 6,499,105 | B1 | 12/2002 | Yoshiura et al. |
| 6,505,160 | B1 | 1/2003 | Levy et al. |
| 6,513,118 | B1 | 1/2003 | Iwamura |
| 6,529,506 | B1 | 3/2003 | Yamamoto et al. |
| 6,557,103 | B1 | 4/2003 | Boncelet et al. |
| 6,563,935 | B1 | 5/2003 | Echizen et al. |
| 6,614,914 | B1 | 9/2003 | Rhoads |
| 6,687,345 | B1 | 2/2004 | Swartz et al. |
| 6,724,914 | B2 | 4/2004 | Brundage et al. |
| 6,834,308 | B1 | 12/2004 | Ikezoye et al. |
| 6,941,275 | B1 | 9/2005 | Swierczek |
| 6,968,337 | B2 | 11/2005 | Wold |
| 6,990,453 | B2 | 1/2006 | Wang |
| 7,016,532 | B2 | 3/2006 | Boncyk et al. |
| 7,174,293 | B2 | 2/2007 | Kenyon |
| 7,194,752 | B1 | 3/2007 | Kenyon et al. |
| 7,227,972 | B2 * | 6/2007 | Brundage et al. ........... 382/100 |
| 7,251,475 | B2 | 7/2007 | Kawamoto |
| 7,421,376 | B1 | 9/2008 | Caruso |
| 2001/0037210 | A1 | 11/2001 | Hirayama |
| 2001/0051915 | A1 | 12/2001 | Ueno et al. |
| 2002/0023058 | A1 | 2/2002 | Taniguchi et al. |
| 2002/0028000 | A1 | 3/2002 | Conwell |
| 2002/0032863 | A1 | 3/2002 | Ha et al. |
| 2002/0034297 | A1 | 3/2002 | Rhoads |
| 2002/0038376 | A1 * | 3/2002 | Halliday ............... 709/231 |
| 2002/0059162 | A1 | 5/2002 | Shinoda et al. |
| 2002/0072982 | A1 | 6/2002 | Barton |
| 2002/0083324 | A1 | 6/2002 | Hirai |
| 2002/0102966 | A1 | 8/2002 | Lev et al. |
| 2002/0122568 | A1 | 9/2002 | Zhao et al. |
| 2002/0152388 | A1 | 10/2002 | Linnartz et al. |
| 2002/0174431 | A1 | 11/2002 | Bowman |
| 2002/0178410 | A1 | 11/2002 | Haitsma et al. |
| 2003/0018709 | A1 * | 1/2003 | Schrempp et al. ........... 709/203 |
| 2003/0033321 | A1 | 2/2003 | Schrempp |
| 2003/0072467 | A1 | 4/2003 | Brundage et al. |
| 2003/0083098 | A1 | 5/2003 | Yamazaki et al. |
| 2004/0199387 | A1 | 10/2004 | Wang |
| 2005/0229107 | A1 | 10/2005 | Hull et al. |
| 2005/0267817 | A1 | 12/2005 | Barton |

FOREIGN PATENT DOCUMENTS

| | | |
|---|---|---|
| WO | WO9743736 | 11/1997 |
| WO | WO0070585 | 11/2000 |
| WO | WO03034320 | 4/2003 |

OTHER PUBLICATIONS

Gonzalez, et al., Digital Image Processing, Sec. 4.2, "Enhancement by Point Processing," 1992, pp. 166-189.

Jain Fundamentals of Digital Image Processing, Sec. 7.2, "Point Operations," 1995 reprint of 1989 publication, pp. 235-241.

"Coding of Still Pictures," JPEG 2000 Part 1 Final Committee Draft Version 1.0, Mar. 16, 2000, 26 pages.

"What is Progressive JPEG?" http;//www.faqs.org/faqs/jpeg-faq/part1/section-11.html, Apr. 1, 2003, 2 pages.

Kutter, "Performance Improvement of Spread Spectrum Based Image Watermarking Schemes Through M-ary Modulation," Lecture Notes in Computer Science, 1999, 16 pages.

Mohan, "Video Sequence Matching", Acoustics, Speech and Signal Processing, 1998. Proceedings of the 1998 IEEE International Conference on vol. 6, Issue, May 12-15, 1998 pp.:3697-3700 vol. 6.

* cited by examiner

DISTRIBUTED CONTENT IDENTIFICATION

RELATED APPLICATION DATA

This patent application is a continuation of U.S. patent application Ser. No. 10/828,930 (now U.S. Pat. No. 7,227,972) filed Apr. 20, 2004, which is a continuation of U.S. patent application Ser. No. 09/978,332, filed Oct. 16, 2001 (now U.S. Pat. No. 6,724,914) which are hereby incorporated by reference.

TECHNICAL FIELD

The invention relates to digital signal processing and more specifically, deriving a content identifier from media content, such as still and moving images (e.g., video) and audio signals.

BACKGROUND AND SUMMARY

Digital watermarking is a process for modifying physical or electronic media to embed a hidden machine-readable code into the media. The media may be modified such that the embedded code is imperceptible or nearly imperceptible to the user, yet may be detected through an automated detection process. Most commonly, digital watermarking is applied to media signals such as images, audio signals, and video signals. However, it may also be applied to other types of media objects, including documents (e.g., through line, word or character shifting), software, multi-dimensional graphics models, and surface textures of objects.

Digital watermarking systems typically have two primary components: an encoder that embeds the hidden watermark in a host media signal, and a decoder that detects and reads the embedded watermark from a signal suspected of containing a watermark (a suspect signal). The encoder embeds a watermark by altering the host media signal such that the alterations are substantially imperceptible to viewers or listeners of the rendered signal, yet machine readable. The reading component analyzes a suspect signal to detect whether a watermark is present. In applications where the watermark encodes information, such as a multi-symbol message, the reader extracts this information from the detected watermark.

Several particular watermarking techniques have been developed. The reader is presumed to be familiar with the literature in this field. Particular techniques for embedding and detecting imperceptible watermarks in media signals are detailed in the assignee's U.S. Pat. Nos. 6,614,914, 6,590,996 and 6,122,403, which are hereby incorporated by reference.

Decoding a digital watermark from an image can be a computationally complex process, particularly when the watermark is designed to survive geometric distortions and distortions due to printing and image capture through an image capture device. The computational complexity of the decoding process makes it a challenge to implement the decoding process efficiently on hand held computing devices, such as Personal Digital Assistants (PDAs) and cell phones.

This same challenge arises for decoding audio watermarks from an audio stream, particularly a digitized version of audio captured from ambient audio through a microphone. It also arises for decoding video watermarks from a video stream.

This document describes a method of progressively decoding a digital watermark on a distributed computing platform. The distributed nature of the decoding process enables the computations of a decoding operation to be distributed to two or more devices, such as a client device and a server computer. The progressive nature of the decoding process reduces bandwidth and computation requirements because it progressively passes more detailed image data as necessary to perform an accurate reading operation of the embedded watermark.

In one implementation, a client device equipped with a digital camera, such as a PDA or cell phone, captures a digital image of a watermarked object, and pre-filters the image to isolate a portion of the image data suspected of containing a digital watermark. The pre-filter de-correlates a portion of the image data suspected of containing a digital watermark from the remaining host image signal using a predictive filter. The client then quantizes the filtered data and progressively transmits the quantized data to a watermark decoder.

The progressive transmitter sends image data as necessary to achieve a valid decoding operation. To reduce bandwidth requirements, the transmitter starts with the most highly quantized version of the filtered image, and sends lesser quantized versions until the watermark decoder completes a successful decoding operation.

As it receives the quantized image data, the watermark decoder buffers it until it receives enough to perform a decoding operation. It provides feedback to the progressive transmitter about the results of the decoding operations to regulate the transfer of image data. For example, if a watermark is not detected in highly quantized data, it signals the transmitter to send more detailed image data. Or, alternatively, if the decoder concludes that it is unlikely to be able to extract the watermark message, it may signal the transmitter to send image data from a subsequent frame.

Once decoding is complete, the watermark decoder initiates an action associated with the decoded watermark message. This action may include using the watermark message to look up data or program instructions to forward to the client or another server.

One aspect of the invention is a method of identifying content in a distributed computing system. The method receives an image or audio signal in a first device in the distributed computing system, such as a cell phone or other wireless device. In this device, the method performs an analysis of characteristics of the signal to identify portions of the signal from which to derive an identifier. The method then sends the portions to a second, remote device in the distributed computing system, such as a server. The server further processes the portions to derive a content identifier, which in turn, is used to look up data corresponding to the content, such as a Uniform Resource Locator. In the case of a wireless telephone network, for example, the method distributes the task of identifying content signals captured through the microphone or camera on the phones in the network.

Further features will become apparent with reference to the following detailed description and accompanying drawings.

DETAILED DESCRIPTION

Figure 1:
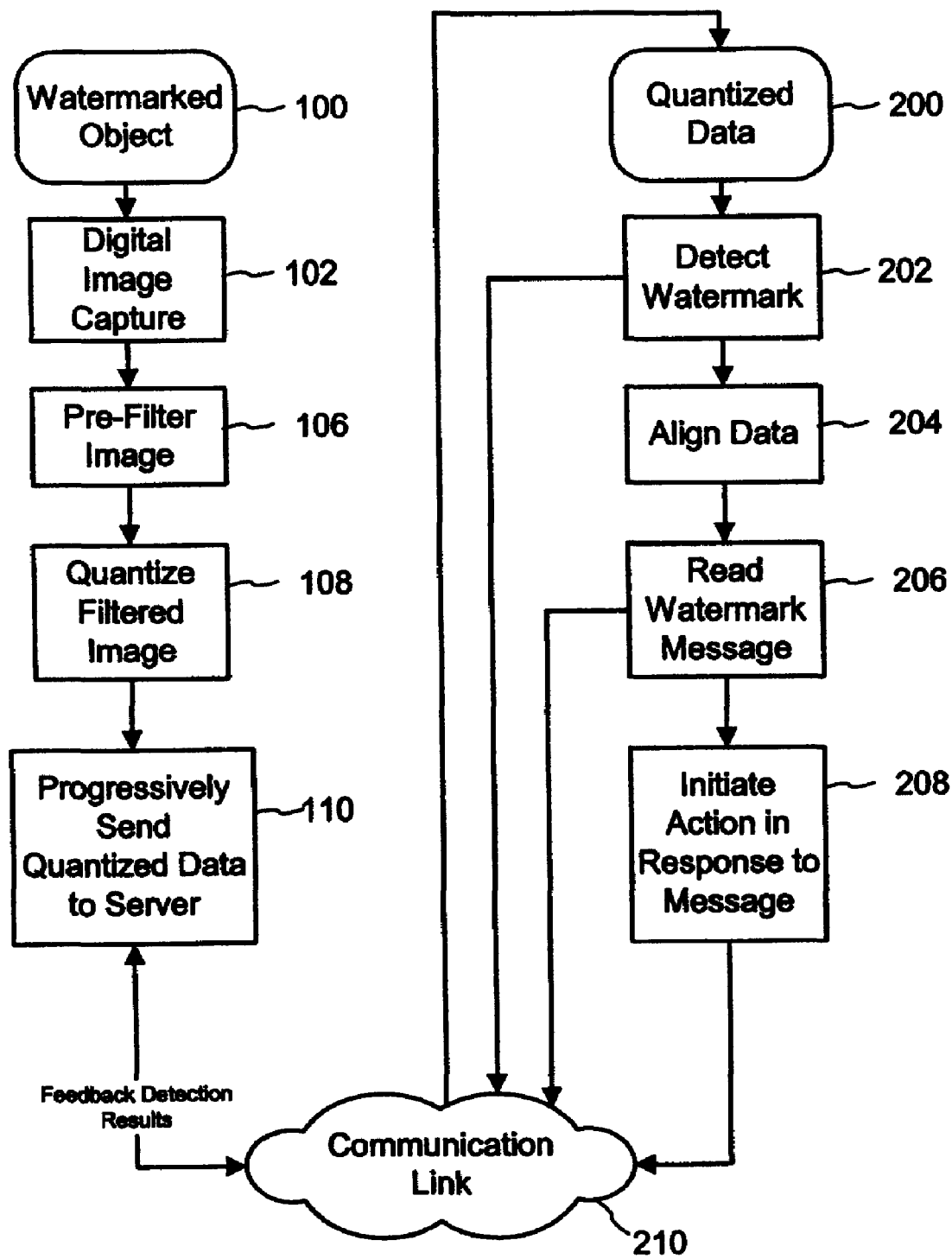
FIG. 1 is a diagram illustrating a progressive watermark decoding process for a distributed computing platform.

FIG. 1 is a diagram illustrating a progressive watermark decoding process for a distributed computing platform. The watermark decoding process scans a digital image of a watermarked object. An image printed on the watermarked object carries a hidden digital watermark with a variable multi-bit message payload as well as a synchronization signal component. The digital watermark subtly modifies image sample values in a particular color channel of a host digital image up or down to encode the message and synchronization components. This digital image is then printed or engraved onto the surface of a physical object, such as paper, product packaging, ID cards etc. A consumer then holds the object to a web camera, which captures digital image frames of the watermarked object (100). A watermark decoding process detects the presence of the watermark, including synchronizing with the embedded synchronization component, and extracts the multi-bit message component. This message carries an index to a database entry indicating an action to take in response to the message.

Blocks 102-110 of FIG. 1 illustrate processes performed on a client device, which captures the digital image, performs pre-processing on the digital image, and progressively sends it to one or more other devices to complete watermark decoding. Blocks 200-208 illustrate processes performed on one or more servers that progressively receive the pre-processed image data from the client.

Before describing the process of FIG. 1 in more detail, it is useful to begin with brief illustration of a watermark embedding process to put the decoding operations in context. In one implementation, the digital watermark embedder repeatedly embeds the watermark signal in blocks of a host digital image. In each block, the embedder modulates image samples within a particular color channel (e.g., the luminance channel, or a channel that varies depending on the host image color). The embedder redundantly encodes the message signal in sub-blocks of the image block. It forms the message from a variable bit payload as well as control and error checking bits. This message is repeated and error correction encoded using a block or convolution code (e.g., BCH, turbo, etc.). The message is also modulated with a carrier signal, such as pseudo random number. The synchronization component is integrated with the message signal as a fixed portion of the message, as part of the carrier signal, and/or as a separate signal. One aspect of the synchronization component forms a constellation of signal peaks in a transform domain, such as the autocorrelation domain and/or Fourier magnitude domain. The embedder inserts the digital watermark signal, including the message and synchronization components, into the host image by adjusting the image samples in the spatial domain and/or spatial frequency domain up or down. Theses adjustments are preferably adapted based on human visibility system modeling to take advantage of the data hiding attributes of the host image. Ultimately, the watermarked image is printed on the host object to form a watermarked object.

Returning to FIG. 1, we now describe the progressive watermark decoding process. The client device, such as a PDA or cell phone, captures digital image frames of the watermarked object through a digital camera (102). The client then pre-filters the image to segregate a portion of the image likely to contain a recoverable digital watermark signal (106). One aspect of this filtering is to transform the color space of the digital image into the color channel or channels in which the watermark has been embedded.

Another aspect is to identify a block of each of the incoming frames that is a likely candidate to have a recoverable digital watermark signal. One implementation segments the center block of each frame and discards the remainder of the frame. An alternative implementation performs an analysis of the image content, looking for spatial block areas that are likely to have a strong watermark signal. This analysis includes, for example, identifying spatial areas with high signal activity (particularly in certain spatial frequency bands), such as textures and areas where there is a high density of image edges. In such areas, the human visibility system modeling of the embedder causes the embedder to place more watermark signal energy due to the greater data hiding capability of the host image, and as such, the watermark signal is likely to be more detectable at these locations. Using such an analysis the pre-processor identifies a block within the frame that is a good candidate for watermark detection. An enhancement to this approach is to rank candidates based on signal activity metrics, and queue the blocks for transmission to the server based on their ranking.

As a further enhancement, the distributed decoding system can be programmed to make block selection of candidate blocks, and transfer candidate blocks based on the computational and memory capabilities of the client, and the bandwidth of the communication link. In particular, when the client software detects that the client device has sufficient processor resources and memory, it can select additional candidate blocks for watermark detection, and buffer them for progressive transmission to the server. The client then forwards candidate blocks to the server as a function of the available bandwidth, the server's availability, and the decoding results from previous blocks. As bandwidth and server availability increases, the client sends more blocks from the current frame, unless the decoding results returned by the server indicate that the watermark signal is weak in that frame.

To further regulate resource usage, the client can spatially scale the image (e.g., down sample) to adjust the size of the image to the available memory, bandwidth and processing resources of the client.

Another aspect of the filtering is to segregate the digital watermark from its host image to the extent possible. One way to accomplish this is to apply a de-correlating filter to separate an estimate of the digital watermark signal from the host image. One way to segregate an estimate of the digital watermark signal is to band-pass filter the image to isolate spatial frequency content that is likely to have a larger ratio of watermark signal to host signal energy.

Another way to estimate the digital watermark signal is to apply a predictive filter to predict the original image, which enables the pre-processor to isolate the residual portion of the signal with a larger ratio of watermark signal to host signal energy. One such predictive filter compares each image sample with neighboring samples to derive an estimate of the watermark signal. For example, it compares a center sample with 8 surrounding samples, and measures the extent to which the center is greater than or less than the neighbors. For efficient implementation, a non-linear predictive filter can be designed as a look up table that takes each difference value between the center sample and the neighbors as input, looks up an output value (either positive or negative, optionally with varying magnitude, depending on the difference value) for each comparison, and sums the output values. The output of this non-linear filter provides an estimate of the watermark signal, which has been embedded by adjusting the image samples up or down.

The result of the pre-filtering operation comprises a reduced version of the received image frame. In particular, it comprises a block within an image frame, representing an estimate of the digital watermark signal.

As shown in block 110, the pre-processor quantizes this block of image data into lower levels of detail. In particular, the digital watermark signal modifies the host image up or down. As such, the pre-filter estimates these adjustments, and the quantizer quantizes the estimated adjustments. At the lowest level of detail, the quantized data comprises a bit of binary information, indicating an up or down adjustment per sample in the selected image sample block. At the next level, the quantized data comprises two bits of binary information, including two levels of detail for a positive adjustment, and two levels of detail for a negative adjustment. In this particular implementation, the finest level of detail includes four bits of information, including 8 levels of positive adjustment and 8 levels of negative adjustment.

The client queues the quantized levels of detail for sending to a server for watermark decoding, and progressively transmits the levels, starting at the lowest level of detail (110). Experiments show that in most cases, a successful read operation occurs on quantized data including two bit planes per image sample in the selected block of an image frame captured from the camera. As such, the server provides feedback on the decoding results (namely, whether it has a successful detect and read), and the client proceeds to send the next quantized block when it appears that a successful read operation will not occur for the current block. Bandwidth permitting, the client continues to send data for a current block until the server reports that reading from that block is futile. At that point, the progressive transmitter sends the next block.

The client may choose the next block from the next frame, or from the current frame in the case where the block analysis routine has identified multiple strong candidate blocks in the current frame.

The client and server communicate over a communication link (210). In one implementation, the communication link comprises a TCP/IP connection over a computer network, namely, the Internet. Other communication protocols and physical transport layers may be used as well, including protocols like UDP and/or protocols used for networked PDAs, cell phones, etc. Some examples or wireless communication protocols that may be used in a distributed architecture for digital watermark decoding include Blue Tooth, GSM and CDMA, to name a few.

For example, a blue tooth enabled hand held image capture device can function as the client in the distributed watermark decoding method. In this example, the hand held reader captures the image, pre-filters it, and progressively transmits the filtered image data to a computer, which completes the decoding operation. The computer itself may be connected to the Internet to send the extracted watermark payload to a server, which looks for related information or content in its database, and returns it to the user's computer or personal digital library accessible via a web interface on the Internet.

Referring to the right side of FIG. 1, the server receives quantized data (200) from the client. While FIG. 1 shows one server decoding process, the distributed architecture may also be designed to include multiple decoding processes or threads of execution on one or more server computing devices or processors within a server. In a case of multiple, parallel decoding processes, the client broadcasts the quantized data to each decoding process, which independently processes the quantized data and reports the results of the decoding operation. The server can transmit the watermark message payload back to the client and/or forward it to a re-direction server for further handling.

As shown in block 202, the decoding process analyzes the quantized block of image data to detect the presence of a watermark. In one implementation, this entails detecting the synchronization component of the digital watermark, and using that component to ascertain the geometric distortion parameters of the block, such as rotation, scale, and translation of the block.

Next, the decoding process uses the geometric distortion parameters to align the quantized image data (204). In one implementation, the alignment process operates in stages in conjunction with the detection process. First, the detection process detects transform domain peaks. The measurement of the peaks provides a preliminary indicator of the presence of the watermark. The decoding process uses a correlation metric to evaluate the presence of the watermark and reports back to the client as shown by the arrow emanating from block 202 to the communication link. At this point, the decoding process may instruct the client to begin sending data for the next block when the preliminary detection result indicates that it is unlikely to extract the digital watermark message.

When the preliminary detection metric is positive, the detection process derives rotation and scale parameters from the detected peak locations and the expected orientation of the peaks in synchronization component. Using these parameters, the alignment process rotates and scales the image data to approximate its original orientation. Next, the alignment process uses a known component of the digital watermark to estimate translation. The translation parameters provide a point of reference to extract embedded message symbols from the quantized data.

Next, the decoding process reads the watermark from the quantized message data (206). As noted previously, the client implementation provides an estimate of the digital watermark signal as an array of positive or negative adjustments. The message reader extracts message symbol estimates from this array by demodulating these estimates from the array using the pseudo random carrier signal and the inverse of the modulation function in the embedder. This process generates multiple estimates for each error correction encoded message symbol. As such, the aggregate of these estimates for each symbol provides a soft bit estimate for an error correction encoded symbol. The reader then performs error correction decoding compatible with the embedder. The error correction decoded result may undergo further error checking to validate the message.

When a valid message is decoded, the server reports this event back to the client as shown by the arrow from block 206 back to the communication link. The watermark message payload may include one or more fields of information, including information about the watermarked object, an index, control flags or instructions, etc. The decoding process may either initiate an action in response to the message, or forward the message to the client or another server to initiate an action related to the watermarked object 208).

In one application of this technology, an identifier in the message payload is used to look up a responsive action related to the watermarked object. One such action is to return a network address of a network resource, such as a web page or other program or service to return to the client. For example, the decoding server passes the identifier to a re-direction server, which in turn looks up a corresponding Uniform Resource Locator (URL) and returns it to the client. This look up operation may also involve other context information, such as information about the user of the client device or capabilities of the device, so that the information returned is tailored to the user and/or device.

Software on the client device, such as an Internet browser, then fetches a web page at the specified URL. A number of variations are possible. For example, the re-direction server can return a web page directly to the client, including links to get information or perform electronic transactions relating to the watermarked object. For more information about this type of use of a digital watermark, see U.S. Pat. Nos. 6,122,403, 6,505,160, and 6,947,571, which are hereby incorporated by reference.

While the above technique is illustrated in the context of a watermarked object, a similar distributed and/or progressive decoding operation may be performed on watermarked audio and video. For example, in the case of watermarked audio, the user holds up the microphone of a client device, such as a cell phone or PDA, to ambient audio, embedded with a digital watermark. The client DSP then pre-filters digitized audio from the microphone to de-correlate the watermark signal from the host audio signal, and progressively sends a quantized version of the resulting estimate of the watermark signal to a decoding process for watermark detection and message extraction operations as above.

The technique described above operates on a video stream captured from a digital camera. However, the video stream may come from other sources as well, such as in streaming or broadcast video delivery to a cell phone or PDA over a wireless connection. In these cases, the client and server process watermarked image blocks from frames of the video stream as above.

Another approach for progressive watermark decoding on a distributed computing system is to transmit varying spatial resolution images progressively from the client to the server until the server achieves a successful decode of the digital watermark message payload. In particular, the client initially sends a low spatial resolution image and progressively sends higher resolution versions of that image to the server. Systems that generate JPEG 2000 images and progressive scan JPEG images are particularly well suited for this application because both systems format the image so that the client can generate a low resolution image version, followed by several iterations of more resolution. In such a system, the server tries to detect the watermark on the low resolution image version first, then again with the next resolution until it successfully extracts a valid watermark message payload.

In certain applications, it is expected that the server will process requests to decode watermarks from blocks transmitted by a large number of clients. In such applications, the server infrastructure includes a number of enhancements to support these requests. One enhancement is distributed request handling. The server system is designed to handle watermark decoding requests from several clients. To process multiple requests, the server has a handler interface that receives the request and queues it for processing on one of many processing units across one or more computers. Further processing requests are supported using multiple threads of execution in the decoding process, including a thread to manage buffering of blocks from a client, one or more threads to detect and read the watermark message from each block, and a thread for dispatching the embedded message extracted from a block.

The decoding process supports multiple input and output streams. Each input stream refers, for example, to the queue of blocks from a particular client. Each output stream refers to the detection and decoding results transferred from the decoding process.

The server system comprises one or more processor units over which the processing load from multiple block decoding requests are distributed. A load balancing process monitors the availability of processing units and regulates the processing load distributed to these processing units based on the availability of processing cycles.

The distributed decoding architecture can also be adapted for client devices that do not always have an available connection to the server system. For example, in devices that are not connected, the client software caches pre-filtered and quantized image blocks. Later, when the user places the client device in a docking station for synchronization with a computer connected to the docking station, the client passes the cached blocks to the server. The server may reside in the docking station computer, or in a computer connected to the docking station computer over a network such as the Internet. In short, the blocks may make one or more hops from client device, to an intermediate device, and finally, to decoding server. With each hop, the transmission protocol may change, such as a serial connection (USB) to the docking station computer, and TCP/IP connection from docking station computer to decoding server.

The data returned in response to the watermark message may be displayed on the docking station computer, may be downloaded to the PDA for display, and/or may be sent to a database on the Internet that the user can access at his or her convenience to download information related to the watermarked object via the embedded watermark. One example is a music file that is transferred to the user's personal library on the Internet in response to showing a watermarked CD or music promotion poster to the client's camera. Another example is an electronic coupon or ticket that is forwarded to the user's e-mail account in response to showing a watermarked object to the client's camera.

The distributed architecture performs efficient watermark decoding by performing a lossy compression of a watermarked media signal that discards much of the media signal information, yet leaves a residual media signal from which the digital watermark is decoded. To further reduce bandwidth requirements, the client may also apply a lossless compression process, such as run length or entropy coding (e.g., Huffman or Arithmetic coding) to reduce the residual image further in size. The losslessly compressed residual image then requires less bandwidth to send to the server at the expense of further lossless compression and decompression steps.

Concluding Remarks

Having described and illustrated the principles of the technology with reference to specific implementations, it will be recognized that the technology can be implemented in many other, different, forms. To provide a comprehensive disclosure without unduly lengthening the specification, applicants incorporate by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method of identifying content in a distributed computing system, the method comprising:

receiving an image or audio signal in a first device in the distributed computing system;

in the first device, analyzing characteristics of the signal to identify portions of the signal to send to a second, remote device for identification of the signal, including ranking the portions for identification based on signal metrics of the portions; and sending the portions to the second, remote device in the distributed computing system, wherein the portions are further processed according to the ranking to derive an identifier.

2. The method of claim 1 wherein the analyzing comprises computing the signal metrics of the portions and identifying the portions to send to the second device based on the metrics.

3. The method of claim 2 wherein the signal metrics are computed from the signal at selected frequencies.

4. The method of claim 3 wherein the signal metrics comprise signal activity measured at the selected frequencies.

5. The method of claim 1 wherein the analyzing comprises pre-filtering the image or audio signal, and the sending includes sending filtered versions of the portions to the second device.

6. The method of claim 1 wherein the first device comprises a wireless device, and the signal comprises an audio signal received through a microphone of the wireless device.

7. The method of claim 1 wherein the first device comprises a wireless device, and the signal comprises an image signal received through a camera of the wireless device.

8. The method of claim 1 further including:
using the identifier to look up a Uniform Resource Locator associated with the content.

9. A wireless, portable computing device comprising:
a sensor for capturing a content signal;
a processor for processing the content signal to analyze characteristics of the signal to identify portions of the signal to send to a second, remote device for identification of the signal, including ranking the portions for identification based on signal metrics of the portions; and
a communication module for sending the portions to the second, remote device, wherein the portions are further processed according to the ranking to derive an identifier.

10. A server comprising:
a communication link with a remote device for receiving portions of a content signal that have been ranked for further identification based on an analysis of signal metrics;
a processor for processing the ranked portions to derive the identifier from the portions; wherein the derived identifier is used to look up a Uniform Resource Locator associated with the content.

* * * * *